(12) United States Patent
Yang et al.

(10) Patent No.: US 6,266,065 B1
(45) Date of Patent: Jul. 24, 2001

(54) METHOD FOR RENDERING 3D TRIANGLE PRIMITIVES

(75) Inventors: Yea-Yun Yang, Miauli; Shu-Fang Hwang; Wei-Kuo Chia, both of HsinChu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/033,351

(22) Filed: Mar. 2, 1998

(51) Int. Cl.$^7$ ........................................................ G06F 15/00
(52) U.S. Cl. ................................................................ 345/422
(58) Field of Search ........................................... 345/419, 420, 345/421, 422, 440, 441

(56) References Cited

U.S. PATENT DOCUMENTS

| | | | | |
|---|---|---|---|---|
| 5,220,646 | * | 6/1993 | Fossum ................................ | 345/422 |
| 5,418,901 | * | 5/1995 | Omori et al. ........................ | 345/441 |
| 5,471,574 | * | 11/1995 | Prasad ................................. | 345/442 |

* cited by examiner

*Primary Examiner*—Phu Nguyen
(74) *Attorney, Agent, or Firm*—Proskauer Rose, LLP

(57) ABSTRACT

A method for drawing a 3D triangle includes decomposing polygons into triangles. The triangles are then truncated into trapezoids, so that they may be drawn in the same direction, such as always top to bottom and left to right. The Z error values are determined for each trapezoid. This allows initial Z values to be correct. The ERROR values may be determined for other triangle attributes such as color, translucence, and texture.

48 Claims, 11 Drawing Sheets

TYPE 1

TYPE 2

TYPE 3

TYPE 4

METHOD FOR RENDERING 3D TRIANGLE PRIMITIVES

BACKGROUND OF THE INVENTION

1. Field of the Invention

The present invention relates to computer graphics and, more particularly, to an improved method for rendering three dimensional triangle primitives.

2. Description of Related Art

Computer graphics have many applications. Improvements in computer graphics displays are desirable.

FIG. 1 depicts a conventional computer system 100. The computer system 100 has a processor 102 comprising one or more CPUs, a main memory 104, a disk memory 106, and an input device 108, such as a keyboard and mouse. These devices 102–108 are connected to a bus 120 which transfers data, i.e., instructions and information, between the devices 102–108. A graphics controller 130 is also connected to the bus 120. As shown, the graphics controller 130 includes a drawing processor 132. The drawing processor 132 is also connected to an address generator 134 and a data input of a frame buffer 136 and a Z buffer 138. The address generator 134, in turn, is connected to RAS (row address select) (not shown), CAS (column address select) (not shown), and chip select inputs (not shown) of the frame buffer 136 and Z buffer 138. Illustratively, the frame and Z buffers 136, 138 are implemented with plural VRAMs (video random access memories) or DRAMs (dynamic random access memories). The frame buffer 136 is connected to a display device 140, such as a cathode ray tube (CRT) or liquid crystal display (LCD) monitor.

The drawing processor 132 receives instructions from the processor 102 for drawing objects. For instance, in the case of a computer aided design (CAD) application, the processor 102 may receive user input regarding creating and locating objects in three dimensional (3D) space. The processor 102, in turn, transfers instructions regarding the size, location, texture, translucence, etc. of such objects to the drawing processor 132. In response, the drawing processor 132 creates a picture element (pixel) image representation of a plane of view of such objects in 3D space. The pixels of the image of each plane of view form part of a frame that is stored by the drawing processor 132 in the frame buffer 136. In 3D graphics applications, each pixel has color data (e.g., data for the red, green, and blue values of the pixel), and Z-values, relating to the Z-coordinate, or depth, of a graphical image. The pixel color data is stored in the frame buffer 136. The pixel Z-values are stored in the Z buffer 138. In two dimensional (2-D) applications, the Z-buffer 138 may be used as an additional frame buffer to hold pixel color data. Drawing processors 132 are known, such as is disclosed in U.S. Pat. Nos. 5,046,023 and 5,185,856. The latter reference discloses a drawing processor that is specifically adapted for rendering 3D objects. The contents of these patents are incorporated herein by reference.

One way of drawing 3D representations of polygons is to decompose each polygon into a number of "primitive" shapes, such as lines, polygons, circles, and ellipses. One common primitive is a triangle. Current three 3D computer graphic methods for rendering triangles do not provide high quality images. There are several problems in rendering high quality triangles.

One problem in drawing a triangle is due to the structure of the display device 140 on which graphics are displayed. As seen in FIG. 2, a display device 140 comprises a number of horizontal rows 202 of pixels 204. The display device may be thought of, in effect, as a cartesian coordinate plane wherein the pixels 204 are located at the intersections between lines in the x and y planes (the x and y planes are illustrated with dashed lines).

Excellent quality straight lines may be displayed if the lines are horizontal, vertical, or at a 45° angle with respect to the x-y plane. Difficulties in displaying excellent lines occurs when a line is at an angle other than 45°. (This invention does not involve curved lines or circles, and the difficulties in drawing such lines are not discussed.) As seen in FIG. 3, a line 300 has a slope in which few points fall at intersections (points 302, 304). This means that in many locations along the line, the line does not fall on the screen where there are pixels.

Many methods exist for drawing lines approximating the correct line (these methods are called "edge walking" when drawing a polygon), and are not described in detail. See, for example, Foley, Van Dam, Feiner & Hughes, *Computer Graphics Principles and Practice*, Chapter 3, Addison-Wesley Publishing Co., 1992. Typically, each time the line increases one unit in either the x or y direction (for example, the y direction), the computer determines the nearest pixel in the perpendicular direction (i.e., the x direction) that is located on that line (i.e., the y plane). For example, when the line 300 crosses line 306 in the y plane, the computer determines that the nearest pixel in the x plane is the pixel 308 directly above. Thus, that pixel is illuminated according to the color, luminescence, etc. of the line being drawn. A second problem with rendering high quality triangles is the drawbacks of existing triangle rendering methods. There are three well known methods for computer graphic rendering of triangles. These methods are (1) span line rendering; (2) triangle drawing; and (3) trapezoid rendering. Span line rendering is performed by drawing a number of lines of varying length. The starting and ending point for each span-line is separately calculated. The edges of each triangle are iterated to produce a set of point-sampled spans. The slopes and starting vertex are used to iterate the pixels forming the span. The large number of calculations results in poor performance (e.g., is slow).

Triangle drawing is performed by sending to the drawing processor the value of each of the three vertices and edge slope. This method is used by many 3D graphics accelerator ASICs currently found in personal computers.

In trapezoid rendering, a polygon is decomposed into a number of trapezoid primitives. Once decomposed, the trapezoids are formed from the two scan lines (a "top" and a "bottom" of the trapezoid) and two line segments (the "sides"). Trapezoids are drawn by stepping down the line segments with two vector generators and filling in all the pixels between them for each scan line.

Each of these methods has drawbacks. Span line rendering has poor performance (e.g., is slow) and without Z error correction, the image quality is poor. If Z error correction is used, the image quality is acceptable, but the performance is further reduced because an error correction value is calculated for each span. The triangle rendering method has a greater performance than the span line method, but has poor image quality because it does not support Z error correction. Trapezoid rendering is difficult because it is difficult to divide a complex polygon into a number of trapezoids. (On the other hand, a complex polygon is easily divided into a number of triangles by simply connecting vertices.) The trapezoid rendering method performs about as well as the triangle drawing method, but has good image quality and performance if used with Z error correction.

Several problems rendering high quality triangles is described with references to one well known method of rendering a 3D triangle are. A triangle typically has one dominant side and two subordinate sides. The dominant side is the side having the greatest range of y values. The triangle 400 shown in FIG. 4A has its dominant side 402 on the left side, and the two subordinate sides 404, 406 to the right. The triangle 450 in FIG. 4B has its dominant side 452 on the right, and the two subordinate sides 454, 456 to the left. Triangles are drawn from the subordinate side to the dominant side. A starting point on the subordinate side and the ending point on the dominant side of each scan line may be calculated.

The vertices on the top and bottom of the dominant side are designated as P1 and P3. The vertex opposite the dominant side is designated P2. Unless P2 is on the same horizontal line (e.g., has the same x value) as either P1 or P3, as seen in FIGS. 4C and 4D, respectively, the triangle is divided into two portions—a top portion and a bottom portion. This is done because the slope of the "line" between P1 and P3 changes at P2 as the y direction increases. It is simpler to edge walk a single slope in the x-y direction. A triangle where P2 has the same y value as P1 or P3 does not have this change in slope problem, and does not need to be divided. To divide a triangle, an imaginary horizontal line is made from P2 to the dominant side. The dashed line 458 in FIG. 4B is such a line.

The "edge walked" polygons form the "outline" of the triangle. The Z values (the apparent "depth" of the triangle) are determined. The triangle is rendered by filling in the scan lines located within the outline according to the proper color and depth. The rendered for 3D shading is a type known as Gourand shading as follows. Each vertex, in addition to having an x, y, and z value, has values for red, green, and blue (R, G, B). The change in RGB values are determined and evenly distributed over the triangle between vertices. A 3D image may also have a translucence (or light transmitting value) (A), and texture values (U,V).

All of the methods discussed have a third drawback, which causes computer generated 3D triangles to appear distorted. This is due in large part to the prior art triangle rendering methods. For example, in prior art methods, every triangle is not drawn in the same direction as every other direction. Rather, the direction the triangle is drawn depends on the shape of the triangle. The method described above, for example, draws triangles from the subordinate side to the dominant side. As seen in FIG. 5, as a result, if a number of triangles are used to form a desired polygon 500 of FIG. 5A, the graphic display 500' of the polygon of FIG. 5B may be drawn having saw-toothed connecting lines 502'.

The reason for this is further explained with reference to FIGS. 5C and 5D. FIG. 5C illustrates a polygon 550. To render a computer graphic representation of this polygon, it may be decomposed into two triangle primitives 552, 554. Because triangles may be drawn from a subordinate side to a dominant side, triangle 552 may be drawn from left to right and triangle 554 may be drawn from right to left. The end point of each scanline may be determined by a horizontal interpolation. Each scanline end point interpolation has a calculation error. Having an error on both sides of the same line (e.g., the common "edge" 556 between the triangles) may result in a saw-toothed edge, as seen in FIG. 5B.

A fourth problem in rendering high quality triangles relates to the apparent depth of the triangle. Prior art methods result in distorted triangles because the display depth value (i.e., the Z value) is not accurate. Thus, when rendering a three dimensional image without back face cuing (removing the polygon "appearing" behind the front polygon before rendering the front polygon), the connecting edges between the front and back faces will show the back face color, which should be hidden behind the front face. If the Z value of the scan line for the back polygon is incorrect, the Z value for the back polygon near the edge is lower (appears to have a depth closer to the screen) than the Z value of the front polygon near the same edge. A desired picture 600 of FIG. 6A has a front face 604 and a back face 604, both triangles having z values connecting at an edge, as seen in the x-z graph of FIG. 6A1. The Z value error results in a graphical representation 650 where the back polygon 652 color at the edge 656 to be shown as if it was located in front of the front polygon 654, as seen in the x-z graph of FIG. 6B1.

Therefore, it is an object of the present invention to provide a method for drawing a 3D computer graphics triangle that eliminates jagged lines at connecting edges.

It is a further object of the present invention to provide a method for drawing a 3D computer graphics triangle wherein connecting edges between front and back faces do not show the back face color.

SUMMARY OF THE INVENTION

These and other objects of the present invention are provided by the present invention. A method for drawing 3D triangle primitives includes decomposing polygons into triangles. The triangles are then truncated into trapezoids, so that they may be drawn in the same direction, such as always top to bottom and left to right. Two Z error values are determined for each trapezoid. This allows initial Z values to be correct for each scan-line. Two error values for other attributes (i.e., color, translucence, or texture), may also be determined for each trapezoid.

The present invention avoids jagged or saw-toothed connecting lines by truncating each triangle into a trapezoid. The trapezoid is always drawn in the same manner, for example, always from top to bottom and from left to right.

The present invention avoids displaying the back edge of connecting edges between front and back faces by calculating two Z error values stored in the Z buffer to correct initial Z values of each scan line so that a correct initial Z value is available.

By overcoming these two problems in the prior art, the present invention improves the quality of computer graphically drawn 3D triangle primitives (and thus the quality of polygons composed of a number of triangles).

BRIEF DESCRIPTION OF THE DRAWINGS

The present invention is described with reference to the following drawings:

FIGS. 6A, 6A1, 6B, and 6B1 illustrate a second drawback of prior art triangle rendering methods;

DETAILED DESCRIPTION OF PREFERRED EMBODIMENTS

Figure 1:
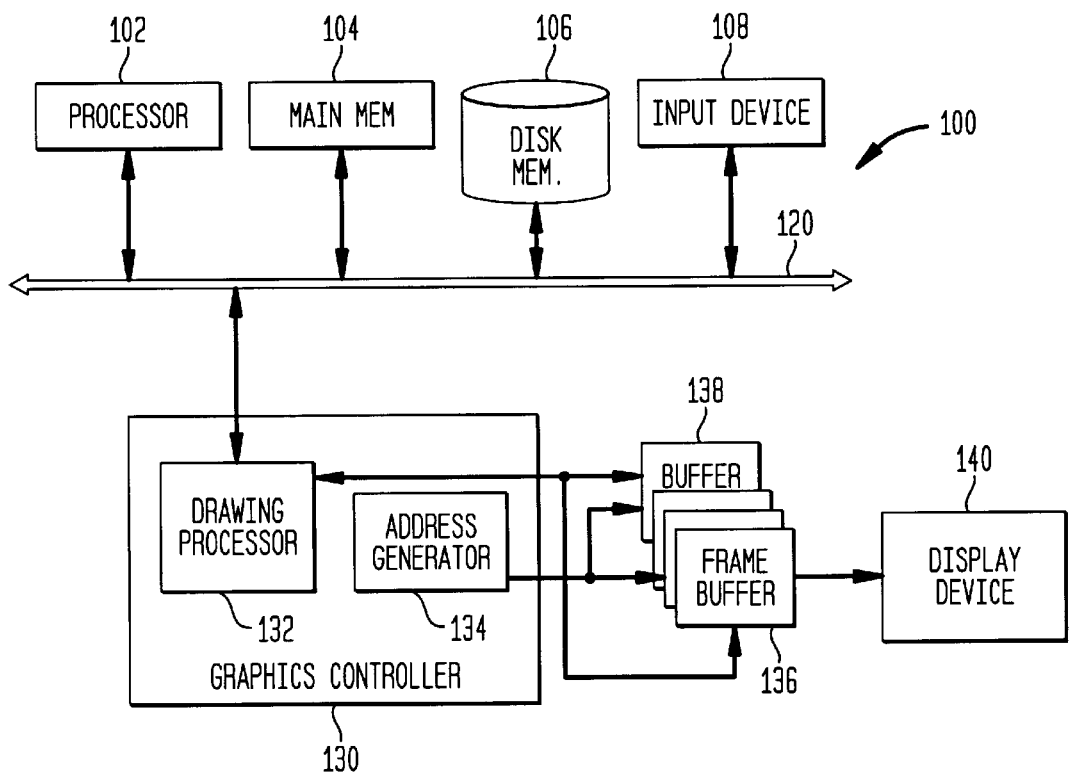
FIG. 1 is a block diagram of a conventional computer system.
Figure 2:
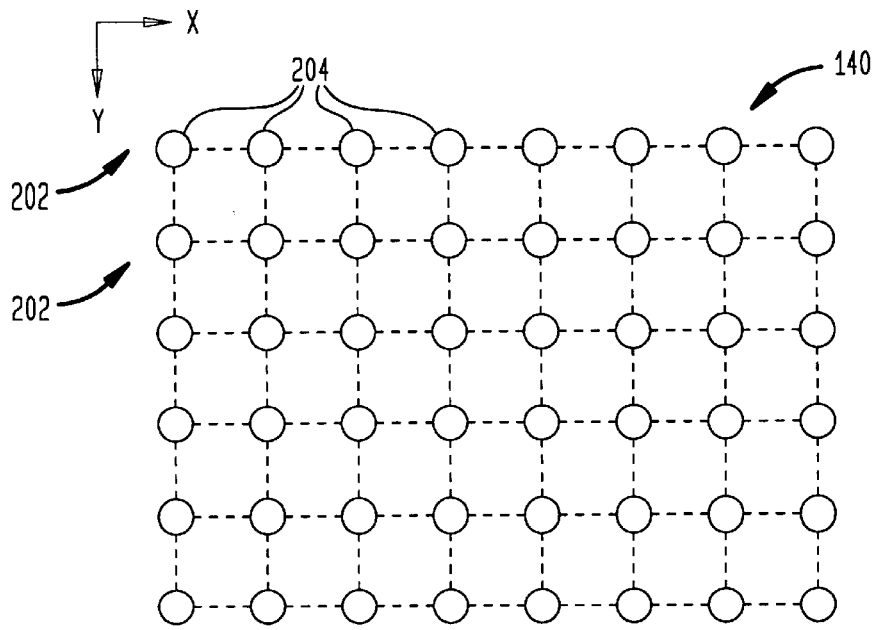
FIG. 2 illustrates a theoretical representation of a display device.
Figure 3:
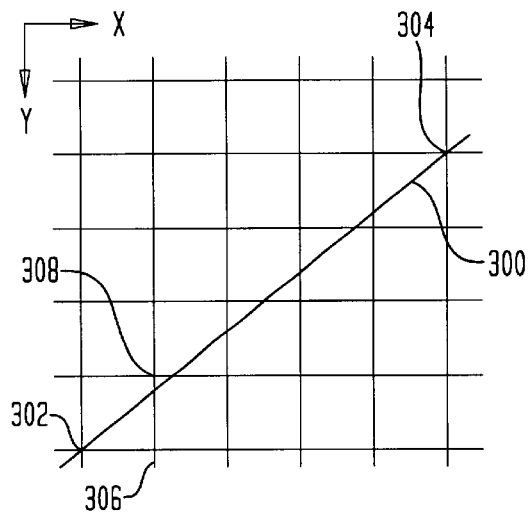
FIG. 3 represents a line to be drawn on a display device.

This description assumes that a number of polygons are decomposed into a number triangles, and that each polygon is treated independently of other polygons. When displaying a 3D object on a display device 140, the drawing processor 132 receives a display list of triangle data to be displayed. This list includes vertices and depth coordinates, color information, etc. The drawing processor determines which of the triangles in the list are to be displayed (i.e., which polygons are visible at the displayed vantage point). The address generator 134 provides the address to the frame buffer 136 (e.g., RAS, CAS). The pixel data stored in the frame buffer is displayed on the screen of the display device 140.

Figure 7A:
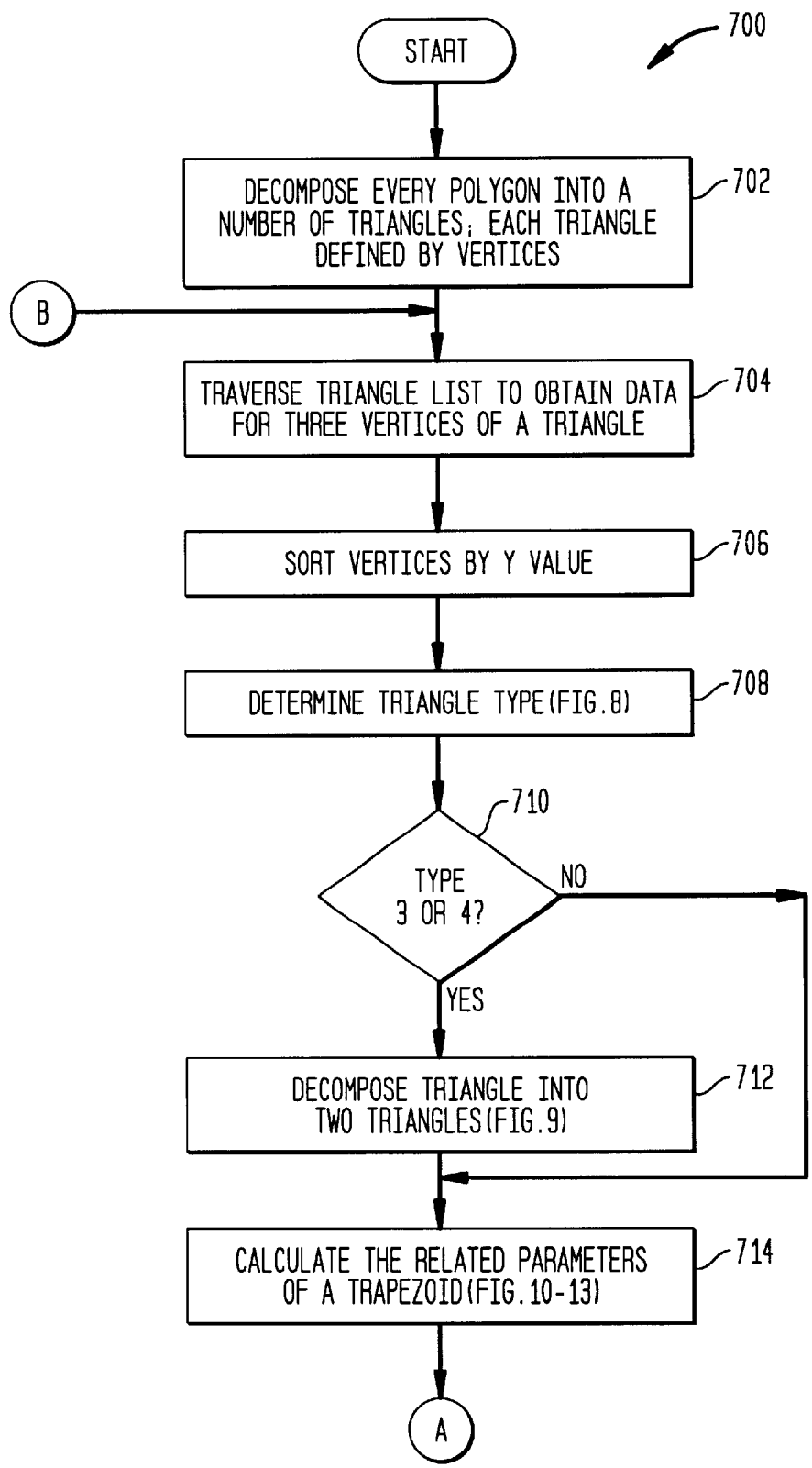
FIGS. 7A and 7B are a flow chart of an illustrative triangle rendering method according to the present invention.
Figure 7B:
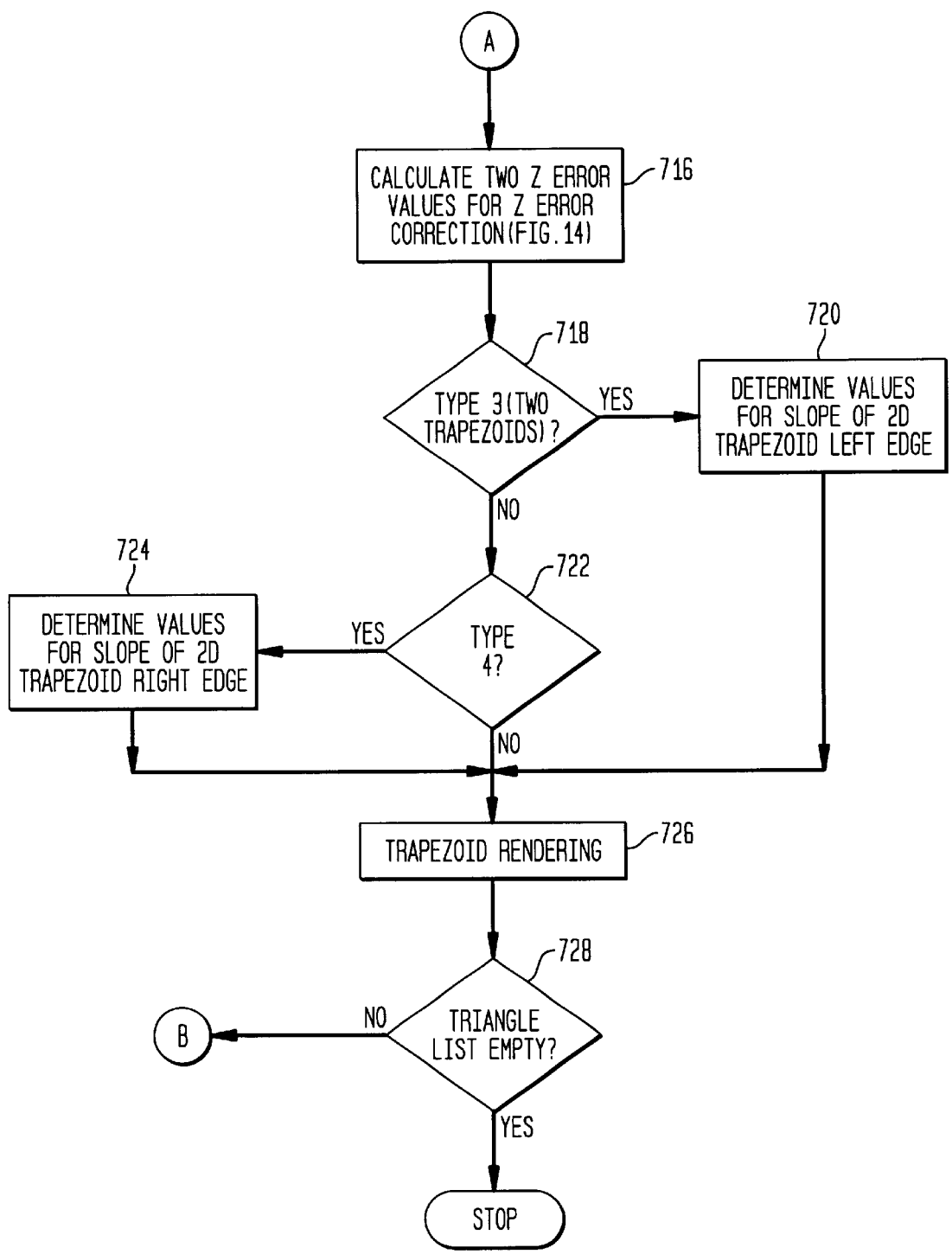

FIG. 7 is a flow chart of a preferred triangle rendering method 700 according to the present invention. One or more objects to be drawn on a screen are analyzed, and polygons are identified. The polygons are decomposed into triangle primitives by drawing lines to various vertices of the polygon. The triangle information, including x, y, and z coordinates and R, G, and B values for each vertex of each triangle are stored in the drawing processor (step 702). When a screen is drawn, the drawing processor is traversed for triangle information (step 704). As long as the drawing processor contains information about a triangle that has not been drawn, but which should appear on the screen, the following steps are performed for each such triangle.

First, the triangle vertices are arranged according to y value (step 706). The vertex having the smallest y value is designated as P1 (counting down from the top of the screen). The vertex having the next lower y value is designated as P2. The vertex with the greatest y value is designated as P3.

Figure 4A:
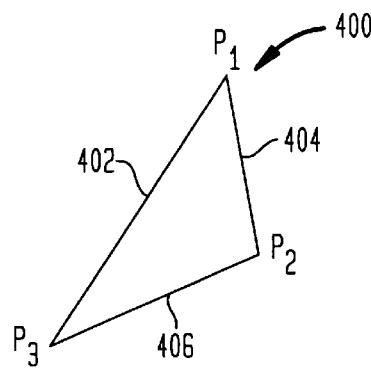
FIGS. 4A–4D illustrate triangles having dominant sides located in different positions.
Figure 4B:
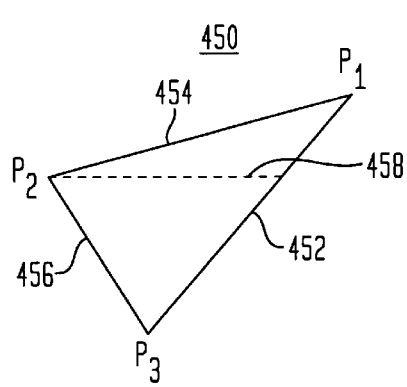
Figure 4C:
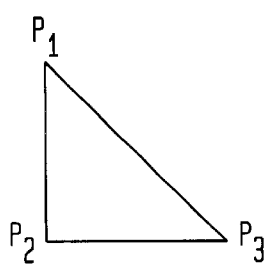
Figure 4D:
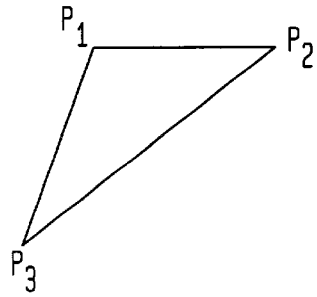
Figure 5A:
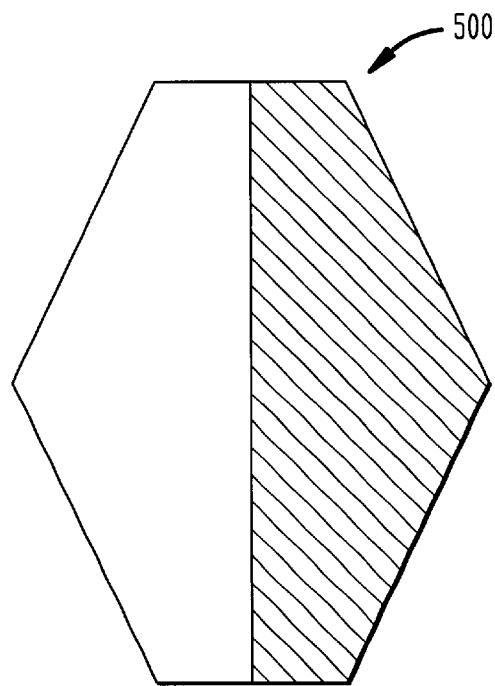
FIGS. 5A, 5B, 5C, and 5D illustrate a first drawback of prior art triangle rendering methods.
Figure 5B:
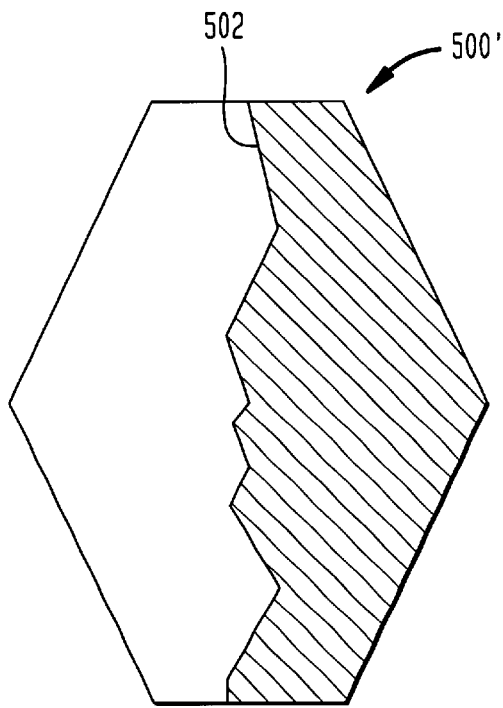
Figure 5C:
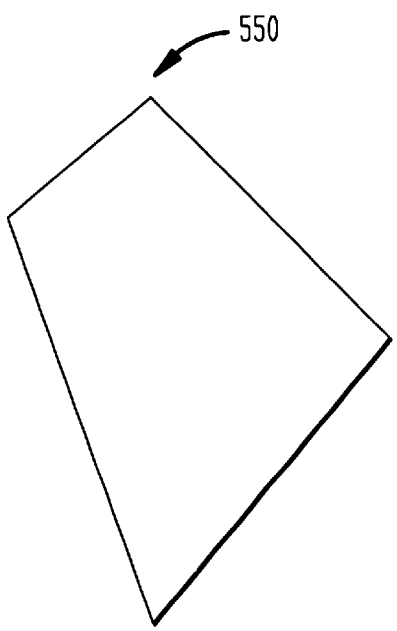
Figure 5D:
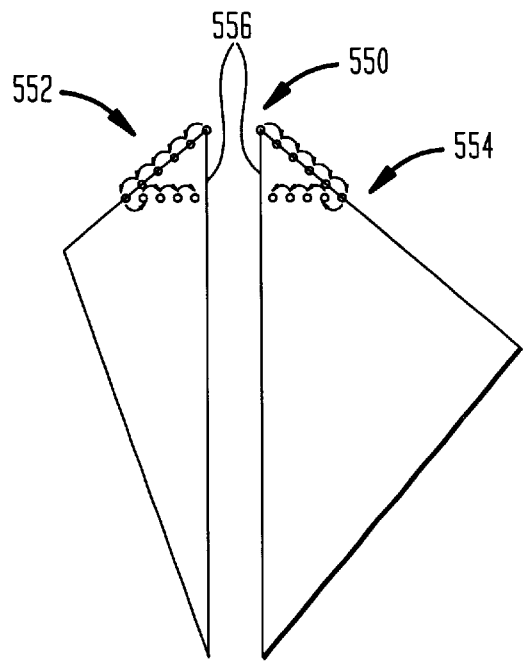
Figure 6A:
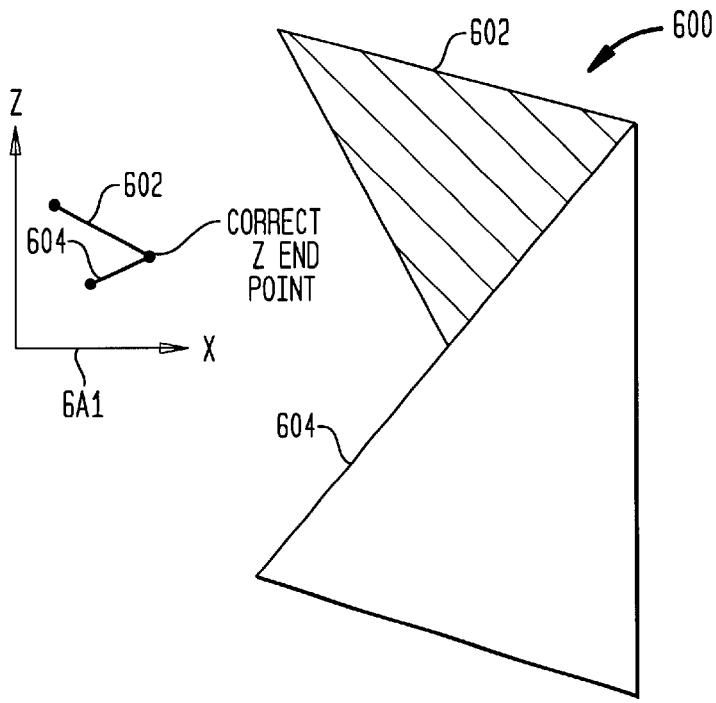
Figure 6B:
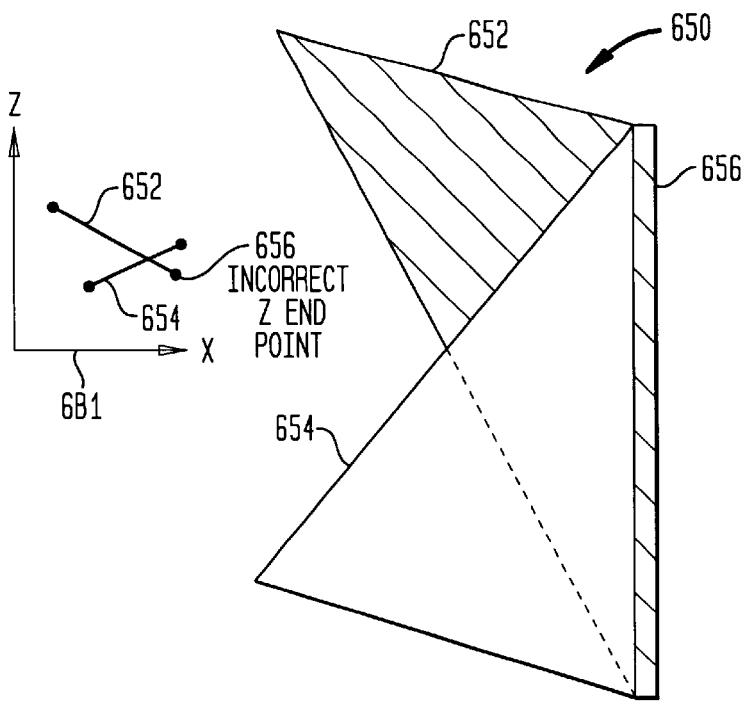

Next, the triangle type is determined (step 708). The four triangle types are illustrated in FIGS. 4A through 4D. FIG. 4C illustrates a "type 1" triangle, wherein the y values of P2 and P3 are equal. FIG. 4D illustrates a "type 2" triangle, wherein the y values of P1 and P2 are equal. FIG. 4B illustrates a "type 3" triangle, wherein the dominant side is on the right. FIG. 4A illustrates a "type 4" triangle, wherein the dominant side is on the left.

Figure 8:
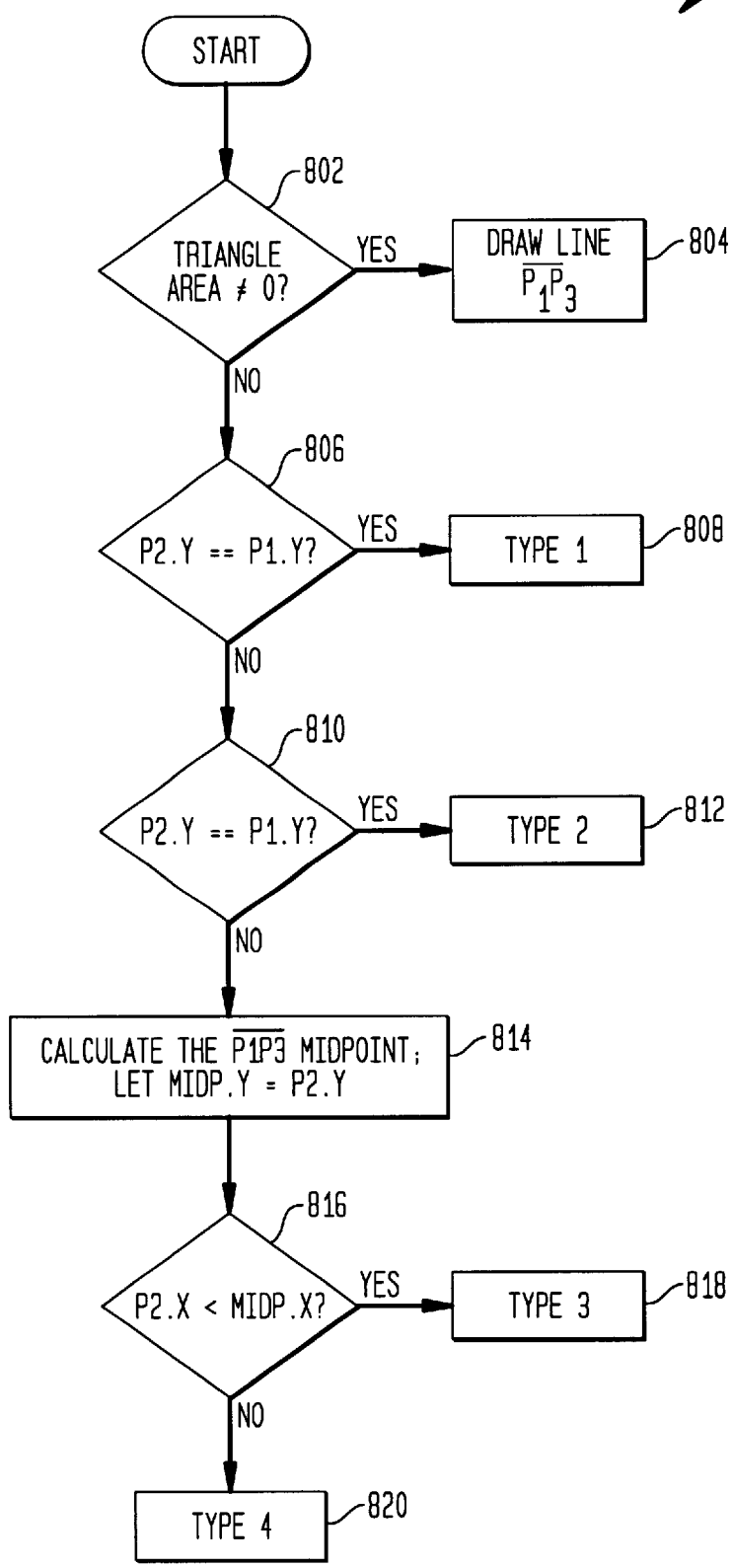
FIG. 8 is a flow chart of an illustrative method for determining a triangle type according to the present invention.

FIG. 8 is a flow chart of one method 708 of determining the triangle type. If the triangle area is zero (step 802), the "triangle" is too thin to be drawn, and a line is drawn (step 804). If the triangle area is greater than zero (step 802), the following steps are performed. The y values of P2 and P3 are compared (step 806). If these values are equal, the triangle is type 1 (step 808). If not, the y values of P2 and P1 are compared (step 810). If these values are equal, the triangle is type 2 (step 812). If these values are not equal, the midpoint of the dominant side is determined by the equations set out in Appendix A. The midpoint of the subordinate sides (the "knee") is P2 (step 814). If the x value of the dominant side midpoint is greater than the x value of the knee (step 816)(i.e., the dominant side is to the right), the triangle is type 3 (step 818). If the x value of the dominant side midpoint is less than the x value of the knee (step 816)(i.e., the dominant side is to the left), the triangle is type 4 (step 820). Appendix A provides midpoint calculations for x, y, z, r, g, and b.

Figure 9:
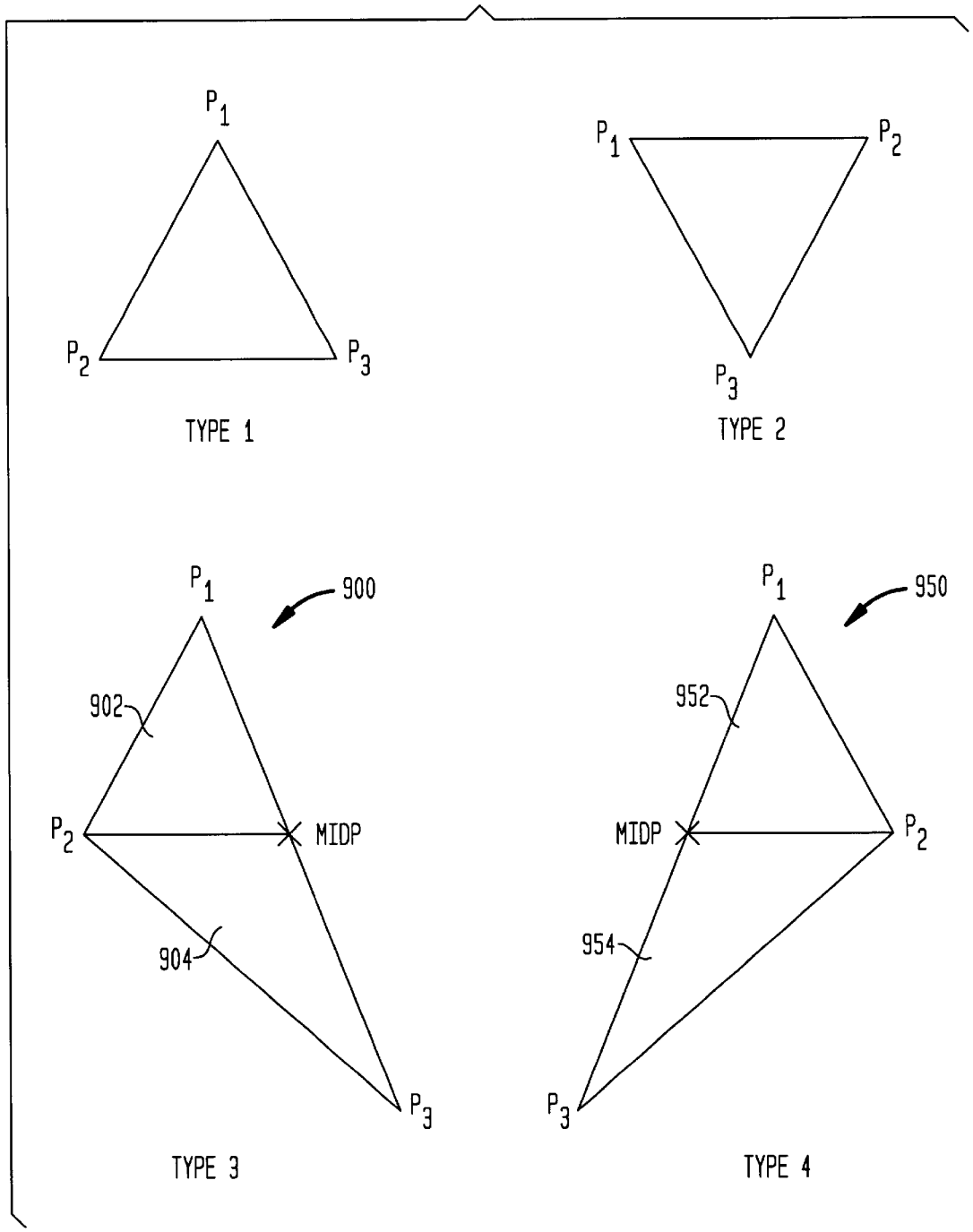
FIG. 9 illustrates the midpoint in type 3 and type 4 triangles and shows type 1 and type 2 triangles

Returning to FIG. 7, after the triangle type is determined, if the triangle is type 3 or 4, the triangle is decomposed into two triangles (step 710), using the knee as a separation point (step 712). As seen in FIG. 9, a type 3 triangle 900 is divided into a top triangle 902 having the vertices P1, P2, Midp and a bottom triangle 904 having the vertices P2, Midp, P3. A type 4 triangle 950 is divided into a top triangle 952 having the vertices P1, Midp, P2, and a bottom triangle 954 having the vertices Midp, P2, P3. Triangle types 1 and 2 do not need to be decomposed into two triangles, because the knee is on the same horizontal line (i.e., y value) as either P1 (type 2) or P3 (type 1).

Figure 10:
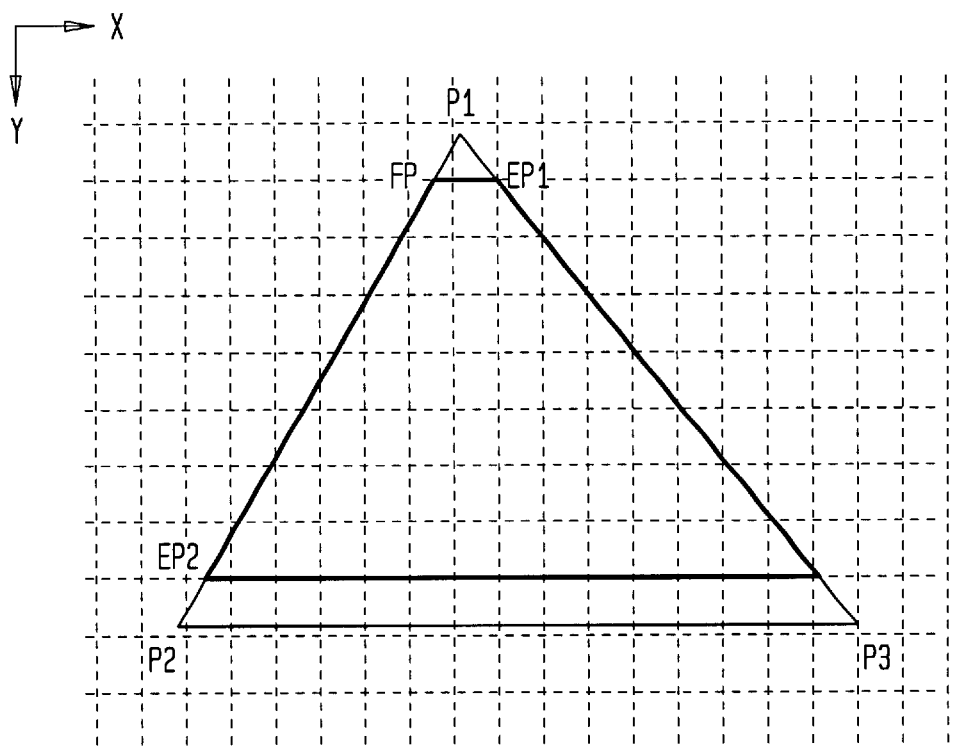
FIGS. 10, 11, 12, and 13 illustrate manners of truncating triangles into trapezoids.
Figure 11:
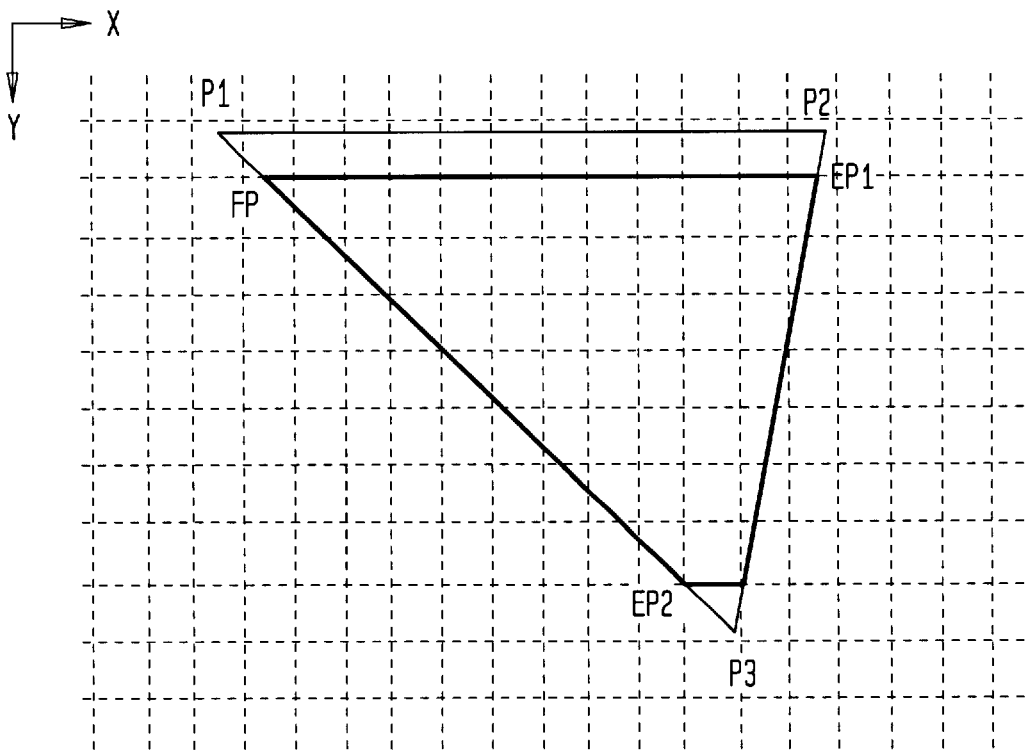
Figure 13:
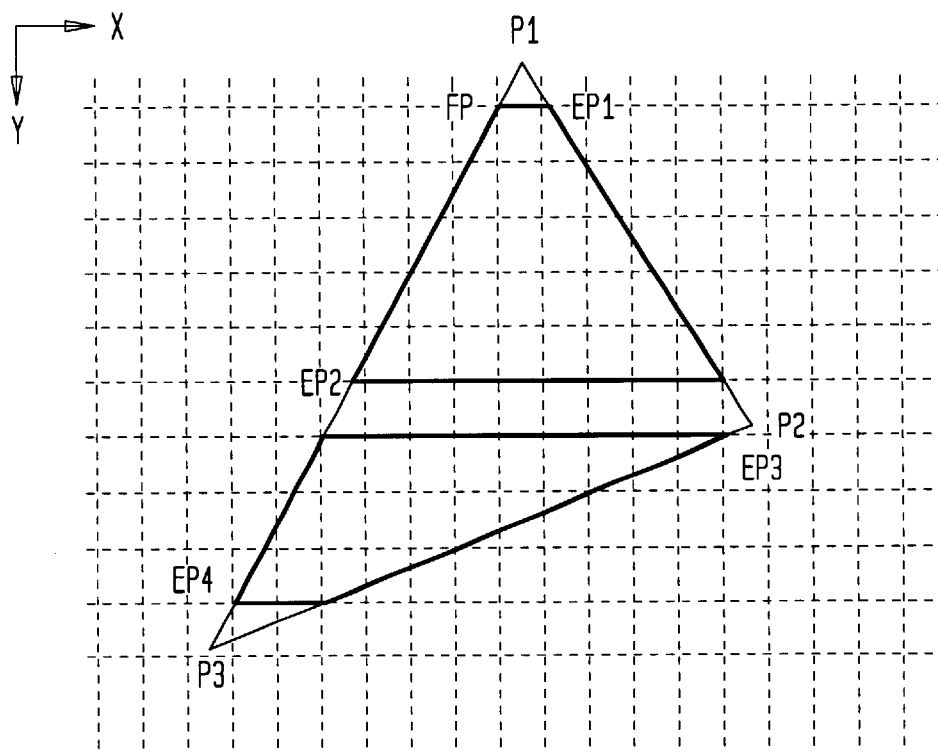

Returning to FIG. 7, the triangle (or triangles, if decomposed into two triangles) are truncated into trapezoids because trapezoids may be drawn in the same direction, i.e., always top to bottom and left to right. (Note, however, that the original polygon was decomposed into triangles, not into trapezoids.) "Truncated" means to "round" the value to the integer value, i.e, drop the decimal portion of the value. Thus, truncate 7.14 is 7. The related parameters of the trapezoids are determined (step 714) as follows:

Type 1: the upper base is truncate (P1.y)+1; and the lower base is truncate (P2.y) (FIG. 10);

Type 2: the upper base is truncate (P1.y)+1; and the lower base is truncate (P3.y) (FIG. 11);

Type 3: the upper base is truncate (P1.y)+1; and the lower base is truncate (P2.y) (top trapezoid);

the upper base is truncate (P2.y)+1; and the lower base is truncate (P3.y) (bottom trapezoid) (FIG. 12); and Type 4: the upper base is truncate: (P1.y)+1 and the lower base is truncate (P2.y) (top trapezoid);

the upper base is truncate (P2.y)+1; and the lower base is truncate (P3.y) (bottom trapezoid) (FIG. 13).

Appendix B provides trapezoid parameter calculations.

As seen in FIGS. 10–13, because each trapezoid may be drawn in a single direction, such as always left to right, top to bottom, it may have a specific starting point FP and trapezoid ending points EP1, EP2. In triangle types 1 and 2, the trapezoid has a single starting point FP and two ending points EP1, EP2. EP1 is the horizontal (i.e., right edge) ending point; EP2 is the vertical (i.e., bottom) ending point.

Figure 12:
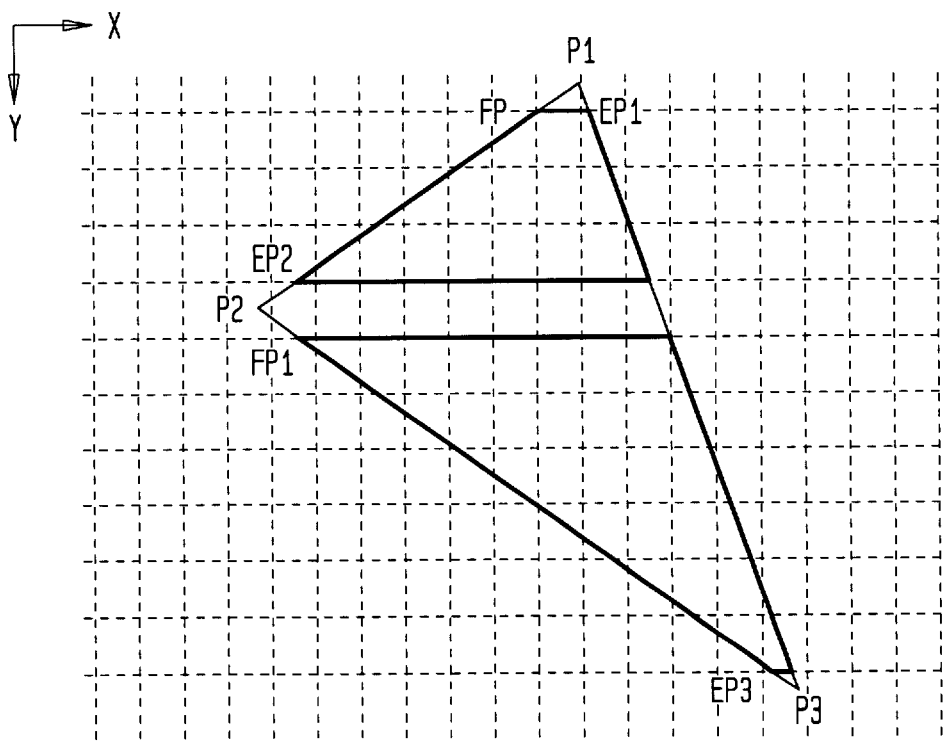

As seen in FIG. 12, in a type 3 triangle, the triangle is divided into two trapezoids. A first trapezoid has a first starting point FP, a horizontal ending point EP1, and a vertical ending point EP2. A second trapezoid has a second starting point FP1 and a vertical ending EP3. Because the trapezoids in this figure are rendered from top to bottom and left to right, the horizontal ending point of the second trapezoid is determined by the slope of the "dominant" side.

As seen in FIG. 13, in a type 4 triangle, the triangle is divided into two trapezoids. A first trapezoid has a first starting point FP, a first horizontal ending point EP1, and a first vertical stopping point EP2. A second trapezoid has a second horizontal ending point EP3 and a second vertical ending point EP4. Because the trapezoids in this figure are rendered from top to bottom and left to right, the "second starting point" is determined by the slope of the "dominant" side.

Certain values, such as FP.y., FP.r., FP.g, FP.b, and EP2.y are located at integer values. The remaining values are fixpoint values (i.e., have an integer and fractional part). In a preferred embodiment, the fixpoint values have a 16 bit integer part and a 16 bit fractional part.

Figure 14:
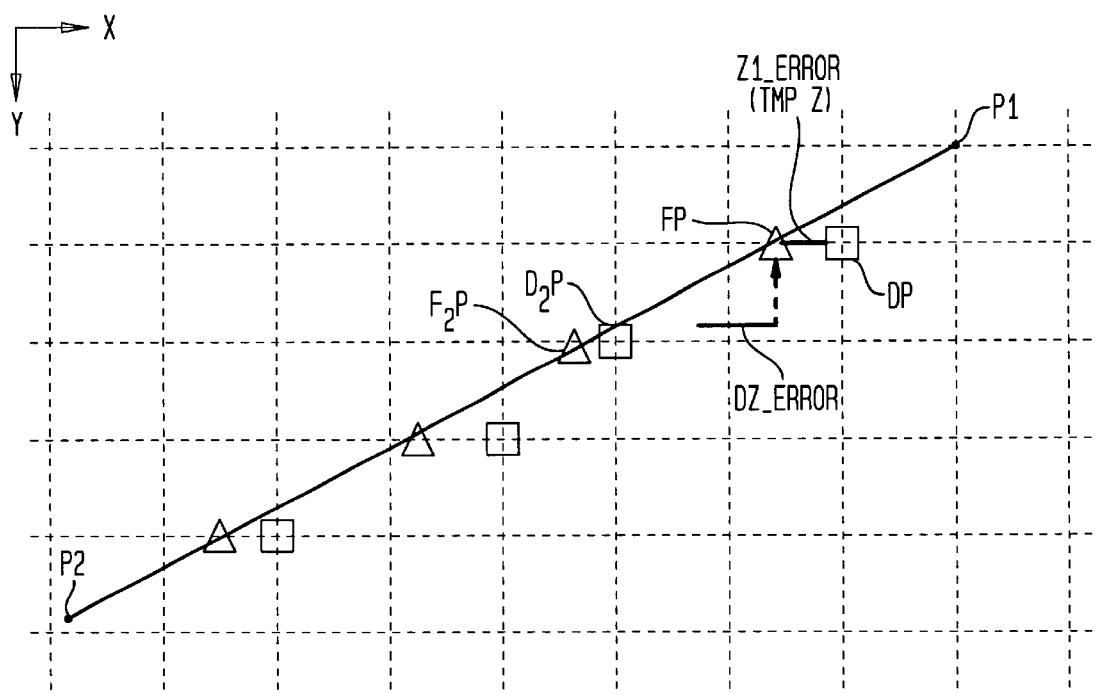
FIG. 14 illustrates Z error correction according to the present invention.

Returning to FIG. 7, two Z error values are determined for each trapezoid (step 716). These values are Z1_ERROR and DZ_ERROR. Referring to FIG. 14, Z1_ERROR is the initial Z value error between FP (the trapezoid starting point) and DP (the start display point at the first scanline of the trapezoid). In FIG. 14, a triangular marking on the line P1, P2 indicates the location where the trapezoid edge crosses as an integer Y value; a square marking indicates a display pixel which of is illuminated in the graphical representation of the edge. The x and y coordinates of DP are DP.x=truncate (FP.x)+1; DP.y=FP.y. If FP does not occur precisely on a pixel, the distance in the z direction between FP and DP is the Z1_ERROR. That is: Z1_ERROR=DP.z–FP.z For this first scanline, DP.z=FP.z+(DP.x–FP.x)*DZH, where DZH is the differential dz/dx as shown in Appendix B, and may be determined by FP.z +Z1_ERROR; tmpz may be set at Z1_ERROR.

The DZ_ERROR is the z error for each scanline. For the second scanline, $F_2P.z$ may be determined by FP.z+$DZ_{12}$, where $DZ_2$=dz/dy along line P1, P2. The starting pixel for the second scanline in the trapezoid is $D_2P$. The distance between $D_2P$ and $F_2P$ is the decimal (fractional) portion of (tmpx-$DX_{12}$). Using the slope of dz/dx (e.g., DZH), $D_2P.z$ may be determined. The Z1_ERROR may be used to replace tmpx, and the DZ_ERROR may be used to replace the decimal portion of $DX_{12}$.

Using these two Z ERROR values in the drawing processor 132, an adder (and not a multiplier) may be used to obtain the correcting initial Z value for each scanline. This provides tmpz=$D_2P.z$–$F_2Pz$. Tmpz and DZ_ERROR may be used to obtain $D_3P.Z$ (initial Z value) for the third scanline and so on.

If the triangle is type 3 or 4, the Z errors for the bottom trapezoids should be determined. For a type 3 trapezoid (step 718), the initial values of left edge coordinates of the second trapezoid are determined. Recall that in a type 3 triangle, the left edge of the top and bottom trapezoids have different slopes. The incremental value of the left edge, the Z1_ERROR, the DZ_ERROR, and the y value of the lower base of the trapezoid are also determined (step 720) according to:

$$Z1\_ERROR=DP1.z-FP1.z$$

$$DZ\_ERROR=[DX_{23}-\text{truncate }(DX_{23})]*DZH$$

$$EP3.y=\text{truncate }(P3.y)$$

If the triangle is type 4 (step 722), initial values of right edge coordinates of the second trapezoid are determined. Recall that in a type 4 triangle, the right edge of the top and bottom trapezoids have different slopes. The incremental value of the right edge and the y value of the lower base of the trapezoid are also determined (step 724).

Next, the triangle is ready to be drawn. The values determined in steps 714–724 are sent to the drawing processor 132. The drawing processor draws the triangle in the typical manner using the values provided. Trapezoid rendering comprises trapezoid edge iteration and interpolation. During edge iteration, a set of point-sampled spans defining an outline of the trapezoid are produced. During interpolation, the starting point and slope of x are used to iterate the pixels forming the span. This "fills in" the span lines between the edges.

Jagged or saw-toothed connecting lines are avoided by truncating each triangle into a trapezoid. The trapezoid is always drawn in the same manner, for example, always from top to bottom and from left to right. Displaying the back edge of connecting edges between front and back faces is avoided by calculating two Z error values stored in the drawing processor and by correcting initial Z values of each scan line so that a correct initial Z value is available.

Calculating two error values improves image quality, such as alpha blend value A, color values R,G B, and texture mapping values U, V. Two error values may be used to obtain the correcting initial value for each scanline for each value (A, R, G, B, U, V). This may be done by adding to step 716 of the FIG. 7B the following:

Calculate two [A, R, G, B, U, V] error values for [A, R, G, B, U, V] error correction.

The calculation is the same as determining two Z error values. For example, the alpha blending (A) error values may be determined:

$$FP.a=(P2.a-P1.a)*(FP.y-P1.y)/(P2.y-P1.y)+P1.a$$

$$DP.a=FP.a+[(\text{truncate }(FP.x)+1)-FP.x]*DAH$$

where $$DAH=(P3.a-P2.a)/(P3.x-P2.x) \text{ for type 1 or type 2; and}$$

$$DAH=(Midp.a-P2.a)/(Midp.x-P2.x) \text{ for types 3 or type 4;}$$

$$A1\_ERROR=DP.a-FP.a$$

$$DA\_ERROR=[DX_{12}-\text{truncate }(DX_{12})]*DAH$$

By overcoming these two problems in the prior art, the present invention improves the quality of computer graphically drawn 3D triangles (and thus the quality of polygons composed of a number of triangles).

The above described embodiments of the invention are intended to be illustrative only. Numerous alternative embodiments may be devised by those skilled in the art without departing from the spirit and scope of the following claims.

Appendix A

Calculations determining midpoints:

$$dx_{12}=p2.x-p1.x$$

$$dy_{12}=p2.y-p1.y$$

$$dy_{13}=p3.y-p1.y$$

$$dz_{13}=p3.z-p1.z$$

$$dr_{13}=p3.r-p1.r$$

$$dg_{13}=p3.g-p1.g$$

$$db_{13}=p3.b-p1.b$$

$$Midp.y=p2.y$$

$$Midp.x=dx_{13}*dy_{12}/dy_{13}+p1.x$$

$$Midp.z=dz_{13}*dy_{12}/dy_{13}+p1.z$$

$$Midp.r=dr_{13}*dy_{12}/dy_{13}+p1.r$$

$$Midp.g=dg_{13}*dy_{12}/dy_{13}+p1.g$$

$$Midp.b=db_{13}*dy_{12}/dy_{13}+p1.b$$

Appendix B

Calculation for determining trapezoid parameters:

Types 1 and 2:

$FP.y=EP1.y=\text{truncate }(p1.y)+1$ $Tmpval\ y=(FP.y-p1.y)/(p2.y-p1.y)$ $FP.x=dx_{12}*tmpval\ y+P1.x$ $FP.z=dz_{12}*tmpval\ y+P1.z$ $FP.r=dr_{12}*tmpval\ y+P1.r$ $FP.g=dg_{12}*tmpval\ y+P1.g$ $FP.b=db_{12}*tmpval\ y+P1.b$ $EP1.x=dx_{13}*(EP1.y-P1.y)/(P3.y-P1.y)+P1.x$ $EP2.y=\text{truncate }(P2.y)$ $DX_{12}=(P2.x-P1.x)/(P2.y-P1.y)$ $DZ_{12}=(P2.z-P1.z)/(P2.y-P1.y)$ $DR_{12}=(P2.r-P1.r)/(P2.y-P1.y)$ $DG_{12}=(P2.g-P1.g)/(P2.y-P1.y)$ $DB_{12}=(P2.b-P1.b)/(P2.y-P1.y)$ $DX_{13}=(P3.x-P1.x)/(P3.y-P1.y)$ $DZH=(P3.z-P2.z)/(P3.x-P2.x)$ $DRH=(P3.r-P2.r)/(P3.x-P2.x)$ $DGH=(P3.g-P2.g)/(P3.x-P2.x)$ $DBH=(P3.b-P2.b)/(P3.x-P2.x)$ (Note: $DZH=dz/dx$, $DRH=dr/dx$, etc.)

Type 3

$DZH=(Midp.z-P2.z)/(Midp.x-P2.x)$ $DRH=(Midp.r-P2.r)/(Midp.x-P2.x)$ $DGH=(Midp.g-P2.g)/(Midp.x-P2.x)$ $DBH=(Midp.b-P2.b)/(Midp.x-P2.x)$ (Note: $DZH=dz/dx$, $DRH=dr/dx$, etc.)

$FP1.y=\text{truncate }(P2.y)+1$ $tmpval\ y=(FP1.y-P2.y)/(P3.y-P2.y)$ $FP1.x=dx_{23}*tmpval\ y+P2.x$ $FP1.z=dz_{23}*tmpval\ y+P2.z$ $FP1.r=dr_{23}*tmpval\ y+P2.r$ $FP1.g=dg_{23}*tmpval\ y+P2.g$ $FP1.b=db_{23}*tmpval\ y+P2.b$ $EP3.y=\text{truncate }(p3.y)$ $DX_{23}=(P3.x-P2.x)/(P3.y-P2.y)$ $DZ_{23}=(P3.z-P2.z)/(P3.y-P2.y)$ $DR_{23}=(P3.r-P2.r)/(P3.y-P2.y)$ $DG_{23}=(P3.g-P2.g)/(P3.y-P2.y)$ $DB_{23}=(P3.b-P2.b)/(P3.y-P2.y)$ Type 4

$DX_{23}=(P3.x-P2.x)/(P3.y-P2.y)$ $EP3.y=\text{truncate }(P2.y)+1$ $EP3.x=(EP3.y-P2.y)*DX_{23}+P2.x$ $EP4.y=\text{truncate }(P3.y)$

We claim:

1. A method for rendering a three dimensional graphical representation of a triangle, comprising the steps of:
   a. truncating the triangle to be rendered into at least one trapezoid;
   b. determining two Z error values for the at least one trapezoid; and
   c. drawing the at least one trapezoid in a predetermined direction.

2. The method of claim 1, wherein before the step of truncating, the method further comprising the step of sorting vertices of a triangle to be rendered according to y value.

3. The method of claim 1, wherein before the step of truncating, the method further comprising the step of determining a triangle type of the triangle to be rendered.

4. The method of claim 3, wherein the step of determining a triangle type further comprises the steps of determining if a middle vertex has a same y value as one of a top vertex and a bottom vertex.

5. The method of claim 4, wherein if the middle vertex does not have a y value the same as one of the top and the bottom vertices, the method further comprising the step of comparing an x value of the middle vertex with a midpoint of a dominant side.

6. The method of claim 5, further comprising the step of dividing the triangle in to a top and a bottom triangle along a horizontal line connecting the middle vertex and the dominant side.

7. The method of claim 4, wherein the determining a triangle type further comprises the steps of:
   a. determining an x value of the middle vertex;
   b. determining an x value of the dominant side midpoint; and
   c. comparing the two determined x values.

8. The method of claim 7, wherein the step of determining an x value of the dominant side midpoint further comprises the step of determining the midpoint according to Midpoint.y=p2.y.

9. The method of claim 1, wherein the step of truncating further comprises the steps of:
   a. truncating a top vertex to a nearby upper integer y value if the top vertex does not fall on an integer y value;
   b. truncating the top vertex to a next upper integer y value if the top vertex falls on an integer y value; and
   c. truncating a bottom vertex to a nearby lower integer y value, if the bottom vertex does not fall on an integer y value.

10. The method of claim 1, wherein the step of determining two Z error values further comprises determining an initial z error value at a trapezoid starting point and determining a z error for each subsequent scan line in the trapezoid.

11. The method of claim 10, wherein the step of determining an initial Z error value further comprises the step of determining Z1_ERROR according to the equation:

$$Z1\_ERROR = DP.z - FP.z$$

where:

$$FP.z = (P2.z - P1.z) * (FP.y - P1.y)/(P2.y - P1.y) + P1.z;\ \text{and}$$

$$DP.z = FP.z + [(\text{truncate}(FP.x) + 1) - FP.x] * DZH.$$

12. The method of claim 10, wherein the step of determining a z error for each subsequent scan line further comprises the step of determining DZ_ERROR according to the equation:

$$DZ\_ERROR = \{(DX_{12} - \text{truncate}(DX_{12})\} * DZH.$$

13. The method of claim 1, wherein the step of drawing the trapezoid further comprises the steps of drawing the trapezoid from top to bottom and from left to right.

14. The method of claim 1, wherein the step of drawing the trapezoid further comprises the steps of iterating edges of the trapezoid and interpolating scan lines between iterated edges.

15. The method of claim 1, wherein the three dimensional triangle is a primitive, the method further comprising the step of before truncating, decomposing a polygon into a number of triangles.

16. The method of claim 1, further comprising the steps of determining two alpha blending error values for the at least one trapezoid.

17. The method of claim 16, wherein the step of determining two alpha blending error values further comprises determining an initial alpha blending error value at a trapezoid starting point and determining an alpha blending error for each subsequent scan line in the trapezoid.

18. The method of claim 1, further comprising the steps of determining two texture error values for the at least one trapezoid.

19. The method of claim 18, wherein the step of determining two texture error values further comprises determining an initial U error value at a trapezoid starting point and determining a U error for each subsequent scan line in the trapezoid.

20. The method of claim 18, wherein the step of determining two texture error values further comprises determining an initial V error value at a trapezoid starting point and determining a V error for each subsequent scan line in the trapezoid.

21. The method of claim 1, further comprising the steps of determining two color error values for the at least one trapezoid.

22. The method of claim 21, wherein the step of determining two texture error values further comprises determining an initial R error value at a trapezoid starting point and determining a R error for each subsequent scan line in the trapezoid.

23. The method of claim 21, wherein the step of determining two color error values further comprises determining an initial G error value at a trapezoid starting point and determining a G error for each subsequent scan line in the trapezoid.

24. The method of claim 21, wherein the step of determining two color error values further comprises determining an initial B error value at a trapezoid starting point and determining a B error for each subsequent scan line in the trapezoid.

25. An apparatus for rendering a three dimensional graphical representation of a triangle, the apparatus comprising a drawing processor configured to:

a. truncate the triangle to be rendered into at least one trapezoid;

b. determine two Z error values for the at least one trapezoid; and c. draw the at least one trapezoid in a predetermined direction.

26. The apparatus of claim 25, wherein the drawing processor is further configured to sort vertices of a triangle to be rendered according to y value before the drawing processor truncates the triangles into the at least one trapezoid.

27. The apparatus of claim 25, wherein the drawing processor is further configured to determine a triangle type of the triangle to be rendered before the drawing processor truncates the triangles into the at least one trapezoid.

28. The apparatus of claim 27, wherein the drawing processor configured to determine a triangle type further determines if a middle vertex has a same y value as one of a top vertex and a bottom vertex.

29. The apparatus of claim 28, wherein if the middle vertex does not have a y value the same as one of the top and the bottom vertices, the drawing processor is further configured to compare an x value of the middle vertex with a midpoint of a dominant side.

30. The apparatus of claim 29, wherein the drawing processor is further configured to divide the triangle in to a top and a bottom triangle along a horizontal line connecting the middle vertex and the dominant side.

31. The apparatus of claim 28, wherein the drawing processor for determining a triangle type is further configured to:

a. determine an x value of the middle vertex;

b. determine an x value of the dominant side midpoint; and c. compare the two determined x values.

32. The apparatus of claim 31, wherein the drawing processor configured to compare an x value of the middle vertex with a midpoint of a dominant side is further configured to determine an x value of the dominant side midpoint according to Midpoint.y=p2.y.

33. The apparatus of claim 25, wherein the drawing processor configured to truncate the triangle to be rendered into at least one trapezoid is further configured to truncate:

a. a top vertex to a nearby upper integer y value if the top vertex does not fall on an integer y value;

b. the top vertex to a next upper integer y value if the top vertex falls on an integer y value; and c. a bottom vertex to a nearby lower integer y value, if the bottom vertex does not fall on an integer y value.

34. The apparatus of claim 25, wherein the drawing processor configured to determine two Z error values is further configured to determine an initial z error value at a trapezoid starting point and to determine a z error for each subsequent scan line in the trapezoid.

35. The apparatus of claim 34, wherein the drawing processor configured to deter an initial Z error value is further configured to determine the Z1_ERROR according to the equation:

$$Z1\_ERROR = DP.z - FP.z$$

where:

$$FP.z = (P2.z - P1.z) * (FP.y - P1.y)/(P2.y - P1.y) + P1.z; \text{ and}$$

$$DP.z = FP.z + \{(\text{truncate}(FP.x)+1) - FP.x\}\{*DZH.$$

36. The apparatus of claim 34, wherein the drawing processor configured to determine a z error for each subsequent scan line is further configured to determine the DZ_ERROR according to the equation:

$$DZ\_ERROR = \{(DX_2 - \text{truncate}(DX_{1,2}))\} * DZH.$$

37. The apparatus of claim 25, wherein the drawing processor configured to draw the trapezoid is further configured to draw the trapezoid from top to bottom and from left to right.

38. The apparatus of claim 25, wherein the drawing processor configured to draw the trapezoid is further configured to iterate the edges of the trapezoid and to interpolate scan lines between iterated edges.

39. The apparatus of claim 25, wherein the three dimensional triangle is a primitive, wherein the drawing processor is further configured to decompose a polygon into a number of triangles before the drawing processor truncates the triangle to be rendered into at least one trapezoid.

40. The apparatus of claim 25, wherein the drawing processor is further configured to determine two alpha blending error values for the at least one trapezoid.

41. The apparatus of claim 40, wherein the drawing processor configured to determine two alpha blending error values is further configured to determine an initial alpha blending error value at a trapezoid starting point and to determine an alpha blending error for each subsequent scan line in the trapezoid.

42. The apparatus of claim 25, wherein the drawing processor is further configured to determine two texture error values for the at least one trapezoid.

43. The apparatus of claim 42, wherein the drawing processor configured to determine two texture error values is further configured to determine an initial U error value at a trapezoid starting point and to determine a U error for each subsequent scan line in the trapezoid.

44. The apparatus of claim 42, wherein the drawing processor configured to determine two texture error values is further configured to determine an initial V error value at a trapezoid starting point and to determine a V error for each subsequent scan line in the trapezoid.

45. The apparatus of claim 25, wherein the drawing processor is further configured to determine two color error values for the at least one trapezoid.

46. The apparatus of claim 45, wherein the drawing processor configured to determine two color error values is further configured to determine an initial R error value at a trapezoid starting point and to determine an R error for each subsequent scan line in the trapezoid.

47. The apparatus of claim 45, wherein the drawing processor configured to determine two color error values is further configured to determine an initial G error value at a trapezoid starting point and to determine a G error for each subsequent scan line in the trapezoid.

48. The apparatus of claim 45, wherein the drawing processor configured to determine two color error values is further configured to determine an initial B error value at a trapezoid starting point and to determine a B error for each subsequent scan line in the trapezoid.

* * * * *